US009067807B2

(12) United States Patent
Soane et al.

(10) Patent No.: US 9,067,807 B2
(45) Date of Patent: Jun. 30, 2015

(54) TREATMENT OF WASTEWATER

(75) Inventors: David Soane, Chestnut Hill, MA (US); Cheng Hu, Belmont, MA (US); Robert P. Mahoney, Newbury, MA (US); William Ware, Jr., Hanover, NH (US)

(73) Assignee: Soane Energy, LLC, Cambridge, MA (US)

( * ) Notice: Subject to any disclaimer, the term of this patent is extended or adjusted under 35 U.S.C. 154(b) by 813 days.

(21) Appl. No.: 12/908,428

(22) Filed: Oct. 20, 2010

(65) Prior Publication Data

US 2011/0253634 A1    Oct. 20, 2011

Related U.S. Application Data

(60) Provisional application No. 61/253,454, filed on Oct. 20, 2009, provisional application No. 61/310,153, filed on Mar. 3, 2010, provisional application No. 61/371,837, filed on Aug. 9, 2010.

(51) Int. Cl.
| | | |
|---|---|---|
| *C02F 1/28* | (2006.01) | |
| *C02F 1/72* | (2006.01) | |
| *C02F 1/50* | (2006.01) | |
| *C02F 1/68* | (2006.01) | |
| *C02F 1/76* | (2006.01) | |
| *C02F 1/78* | (2006.01) | |
| *C02F 5/02* | (2006.01) | |
| *C02F 101/20* | (2006.01) | |
| *C02F 101/32* | (2006.01) | |
| *C02F 103/36* | (2006.01) | |

(52) U.S. Cl.
CPC . *C02F 1/28* (2013.01); *C02F 1/281* (2013.01); *C02F 1/283* (2013.01); *C02F 1/285* (2013.01); *C02F 1/286* (2013.01); *C02F 1/288* (2013.01); *C02F 1/50* (2013.01); *C02F 1/686* (2013.01); *C02F 1/688* (2013.01); *C02F 1/72* (2013.01); *C02F 1/722* (2013.01); *C02F 1/76* (2013.01); *C02F 1/78* (2013.01); *C02F 5/02* (2013.01); *C02F 2101/203* (2013.01); *C02F 2101/32* (2013.01); *C02F 2103/365* (2013.01); *C02F 2303/04* (2013.01); *C02F 2303/18* (2013.01)

(58) Field of Classification Search
USPC ........................................................ 210/665
See application file for complete search history.

(56) References Cited

U.S. PATENT DOCUMENTS

| | | | |
|---|---|---|---|
| 3,284,351 A | | 11/1966 | Dajani et al. |
| 4,444,665 A | * | 4/1984 | Hildebrandt ................ 210/660 |
| 5,082,568 A | | 1/1992 | Holler |
| 5,240,600 A | | 8/1993 | Wang et al. |
| 5,268,109 A | * | 12/1993 | Boyd ............................ 210/691 |
| 5,433,853 A | | 7/1995 | Mamone |
| 5,626,761 A | | 5/1997 | Howery et al. |
| 5,637,229 A | | 6/1997 | Rieber |
| 5,649,894 A | | 7/1997 | White et al. |

(Continued)

FOREIGN PATENT DOCUMENTS

WO    2009032455 A1    3/2009

*Primary Examiner* — Tony G Soohoo
*Assistant Examiner* — Peter Keyworth
(74) *Attorney, Agent, or Firm* — Elmore Patent Law Group, P.C.; Mahreen Chaudhry Hoda; Carolyn S. Elmore, Esq.

(57) ABSTRACT

The present invention provides systems, methods and devices for removing contaminants from an aqueous stream. In embodiments, these systems and methods may be applied to particular applications, for example removal of contaminants in aqueous streams associated with the petroleum industry.

11 Claims, 3 Drawing Sheets

(56) References Cited

U.S. PATENT DOCUMENTS

| | | | |
|---|---|---|---|
| 5,730,882 A | 3/1998 | Gallup et al. | |
| 5,753,125 A | 5/1998 | Kreisler | |
| 5,855,793 A | 1/1999 | Ikeda et al. | |
| 5,904,832 A | 5/1999 | Clifford et al. | |
| 5,942,115 A | 8/1999 | Rieber | |
| 5,980,716 A * | 11/1999 | Horinouchi et al. | 204/524 |
| 6,039,880 A | 3/2000 | Morataya | |
| 6,059,977 A | 5/2000 | Rowney et al. | |
| 6,083,404 A | 7/2000 | Sommese et al. | |
| 6,096,227 A | 8/2000 | Conaway | |
| 6,117,333 A | 9/2000 | Frankiewicz et al. | |
| 6,139,753 A | 10/2000 | Taylor | |
| 6,143,182 A | 11/2000 | Huang et al. | |
| 6,165,369 A | 12/2000 | Tanis et al. | |
| 6,177,016 B1 | 1/2001 | Miller et al. | |
| 6,206,098 B1 | 3/2001 | Cooper et al. | |
| 6,217,778 B1 | 4/2001 | Shing et al. | |
| 6,238,571 B1 | 5/2001 | Olmez et al. | |
| 6,254,782 B1 | 7/2001 | Kreisler | |
| 6,274,045 B1 | 8/2001 | Kreisler | |
| 6,416,668 B1 | 7/2002 | Al-Samadi | |
| 6,521,131 B1 * | 2/2003 | Hamilton et al. | 210/662 |
| 6,569,342 B1 | 5/2003 | Willuweit et al. | |
| 6,576,144 B1 | 6/2003 | Vineyard | |
| 6,582,605 B2 | 6/2003 | Krulik et al. | |
| 6,623,211 B2 | 9/2003 | Kukor et al. | |
| 6,627,084 B2 | 9/2003 | Murphy et al. | |
| 6,635,177 B2 | 10/2003 | Oswald et al. | |
| 6,773,604 B2 | 8/2004 | Walton et al. | |
| 6,783,685 B2 | 8/2004 | Hwang | |
| 6,802,979 B2 | 10/2004 | Panning et al. | |
| 6,893,567 B1 | 5/2005 | Vanotti et al. | |
| 6,896,815 B2 | 5/2005 | Cort | |
| 7,014,774 B2 | 3/2006 | Yamada et al. | |
| 7,022,240 B2 | 4/2006 | Hart et al. | |
| 7,029,589 B2 | 4/2006 | McGinness | |
| 7,105,094 B1 | 9/2006 | Lee et al. | |
| 7,147,783 B2 | 12/2006 | Walton et al. | |
| 7,166,227 B2 | 1/2007 | Karlsson et al. | |
| 7,192,527 B2 | 3/2007 | Reddy | |
| 7,329,355 B1 | 2/2008 | Burns et al. | |
| 7,335,310 B2 | 2/2008 | Suzuki et al. | |
| 7,374,690 B2 | 5/2008 | Reddy | |
| 7,378,015 B2 | 5/2008 | Rinker et al. | |
| 7,438,828 B2 | 10/2008 | Young | |
| 7,445,718 B2 | 11/2008 | Misra et al. | |
| 7,476,324 B2 | 1/2009 | Ciampi et al. | |
| 7,553,418 B2 | 6/2009 | Khudenko et al. | |
| 7,572,382 B2 | 8/2009 | Mesher et al. | |
| 7,591,952 B2 | 9/2009 | Young | |
| 7,666,315 B2 | 2/2010 | Lopez Martinez et al. | |
| 7,799,232 B2 | 9/2010 | Hayashi et al. | |
| 7,972,518 B2 | 7/2011 | Ralph et al. | |
| 8,002,993 B2 | 8/2011 | Gold et al. | |
| 8,012,358 B2 | 9/2011 | Slabaugh et al. | |
| 8,016,041 B2 | 9/2011 | Kerfoot | |
| 8,034,246 B2 * | 10/2011 | Gustafsson et al. | 210/703 |
| 8,052,876 B2 | 11/2011 | Pereira, Jr. et al. | |
| 8,097,167 B2 | 1/2012 | Moody et al. | |
| 8,101,086 B2 | 1/2012 | Varadaraj et al. | |
| 8,133,164 B2 | 3/2012 | Beebe et al. | |
| 2003/0196955 A1 | 10/2003 | Hughes | |
| 2005/0098504 A1 | 5/2005 | Manz et al. | |
| 2007/0039300 A1 | 2/2007 | Kahlbaugh et al. | |
| 2007/0102359 A1 * | 5/2007 | Lombardi et al. | 210/639 |
| 2008/0023401 A1 * | 1/2008 | Arato et al. | 210/662 |
| 2008/0156709 A1 | 7/2008 | Johnson | |
| 2008/0237141 A1 | 10/2008 | Kerfoot | |
| 2009/0200233 A1 | 8/2009 | Bergendahl et al. | |
| 2012/0267315 A1 | 10/2012 | Soane et al. | |

* cited by examiner

TREATMENT OF WASTEWATER

RELATED APPLICATIONS

This application claims the benefit of U.S. Provisional Application Nos. 61/253,454 filed on Oct. 20, 2009, 61/310,153 filed on Mar. 3, 2010 and 61/371,837 filed on Aug. 9, 2010. The entire teachings of the above applications are incorporated herein by reference.

FIELD OF APPLICATION

This application relates generally to systems and methods for removing contaminants from wastewater.

BACKGROUND

Certain undesirable materials are found to be contaminants in wastewater. Water steams can be contaminated with substances like iron, manganese, organic matter, hydrogen sulfide, or bacteria. Iron causes taste and odor problems in potable water, causes staining in laundry, wash, swimming pool, or process water, and it causes fouling and deposits in boiler and cooling water systems. In many aqueous systems such as drain water, bilge water, grease traps, and holding tanks, odors can be caused by sulfides, mercaptans, and organic matter. These odors can be treated by oxidizing agents, but the oxidizers can be difficult to administer in low-flow or unattended areas. There remains a need for improved methods to treat metals, organics, bacteria, and odor compounds in water streams.

Wastewater management is a major problem in the petroleum industry. Petroleum industry wastewater includes oilfield produced water and aqueous refinery effluents. Petroleum industry wastewater also includes water used for hydraulic fracturing of oil-containing or natural-gas-containing geological formations.

Contaminants found in oilfield produced water and aqueous refinery effluents can include, at varying levels, materials such as: (1) dispersed oil and grease, if not removed by mechanical pretreatment separators can clog post-treatment equipment; (2) benzene, toluene, ethylbenzene and xylenes (BTEX), a volatile fraction that is usually handled by onsite wastewater treatments (WWT); (3) water-soluble organics, again usually handled by the WWT system; (4) sparingly soluble nonvolatile organics, including aromatics with molecular weights higher than BTEX but lower than asphaltenes, typically not removable by WWT systems; (5) treatment chemicals, such as drilling, completion, stimulation and production chemicals; (6) produced solids, usually removed by mechanical separators; and (7) total dissolved solids including metals, a particular problem because many metals are considered toxic. A variety of treatments are available to remove these contaminants, including the use of organophilic clays, carbon types, ion exchange resins, coalescers, coagulants, filters, absorbers, alpha hydroxy acids, dithiocarbamates for metals, and media filtration. There remains a need in the art, however, to identify more effective, efficient and cost-conscious solutions to these wastewater problems.

The urgency for improved wastewater management in the petroleum industry is heightened by rising public concern over environmental hazards and toxicities. For selenium, as an example, the U.S. Environmental Protection agency (EPA) plans to incorporate new discharge limits as low as 5 ppb. Current technologies for selenium removal include adsorption & precipitation, ion exchange, chemical or biological reduction, oxidation, and membrane treatment (nano-filtration or reverse osmosis). Even using these methods, it would be difficult and costly to meet the standards that the EPA is considering. Zinc and its compounds are another set of regulated inorganic contaminants in petroleum refinery wastewater. These compounds originate from many sources within a refinery including artificial addition, and require end-of-pipe treatment. Zinc compounds and other metals can be removed from wastewater using technologies such as lime precipitation, coagulation & flocculation, activated carbon adsorption, membrane process, ion exchange, electrochemical process, biological treatment, and chemical reaction to achieve in practical large scale. Some regulatory agencies have set discharge limits for these and other metals that exceed the capacity for commercial metals removal processes. A pressing need exists to improve methods for removing metals from wastewater in light of the increasing regulatory scrutiny of such wastewater contaminants.

Petroleum industry wastewater also includes water used for hydraulic fracturing. In the recovery of oil and gas from geological formations, hydraulic fracturing is a process of pumping fluids into a wellbore at high pressures to fracture the hydrocarbon-bearing rock structures. This fracturing increases the porosity or permeability of the formation and can increase the flow of oil and gas to the wellbore, resulting in improved recovery.

Hydraulic fracturing for hydrocarbon-containing formations typically uses water obtained from two sources: 1) surface water derived from water wells, streams, lakes, and the like, that has not been previously used in the fracturing process; and 2) water that has been used in, and/or flows back from fracturing operations ("frac flowback water"). Processes exist for treating both surface and flowback water sources to prepare them for use or re-use in hydraulic fracturing. Without appropriate treatment, contaminants entering the frac water can cause formation damage, plugging, lost production and increased demand for further chemical additives.

Iron in hydraulic fracturing water can cause corrosion, plugging of downhole formations and equipment, an elevated demand for frac additive chemicals, and membrane fouling in treatment processes. Techniques available for removing iron from frac water include aeration and sedimentation, softening with lime soda ash, and ion exchange. Aeration and other chemical oxidation practices are known for household well water treatment to remove iron. Oxidation converts the soluble iron ($Fe^{+2}$) form to the less soluble iron ($Fe^{+3}$) oxidation state, causing it to precipitate, often as iron hydroxide, which is collected by filtration or sedimentation. Greensand iron removal is one of the typical methods. However, greensand impregnated with potassium permanganate is only capable of treating iron concentrations up to a few ppm, while the iron concentration in oilfield frac flowback water and produced water can be as high as 300 ppm. Current methods of oxidant encapsulation and controlled release for soil and ground water remediation are not suitable for oilfield frac flow back water iron removal since the oxidant release rate is too slow for continuous flow through process. Ion Exchange and chelating resins cannot remove iron effectively from frac flow back water due to the co-existence of the high concentrations of other multivalent cations.

There remains a need in the art, therefore, to provide water treatment systems and methods that can remove iron contaminants effectively from water to be used in hydraulic fracturing, especially frac flowback water, where iron contaminants reach high levels. In addition, there remains a need for integrated water treatment systems that interface with the hydraulic fracturing processes efficiently, and that prepare water in a cost-effective way for use in these processes.

SUMMARY

The present invention provides modules, systems and methods for removing contaminants from a fluid stream, such as a wastewater stream.

In an embodiment, the invention provides a system for removing contaminants from a waste stream, comprising two or more modules in fluid communication with the waste stream, each module comprising either: (a) an oxidizing agent or (b) a filtration medium comprising a substrate for supporting a modifier compound, and a modifier compound attached thereto, wherein the modifier compound has an affinity for a contaminant in the waste stream, forming a complex with the contaminant and thereby removing it from the waste stream, wherein at least one module comprises a filtration medium.

In an embodiment, the invention provides a method of removing contaminants from a fluid stream, comprising the steps of: (a) contacting the contaminants in the fluid stream with an oxidizing agent, thereby oxidizing the contaminants within the fluid stream, and (b) removing the oxidized contaminants from the fluid stream.

In an embodiment, the invention provides a method for removing a contaminant in contaminated water, comprising the step of contacting the contaminated water with a targeted sorbent having a specific affinity for the contaminant, wherein the targeted sorbent comprises a supportive substrate modified with one or more combinations of functional components.

In an embodiment, the invention provides a system for treating frac flowback water, comprising a sequential treatment pathway comprising a plurality of treatment modules, the plurality of treatment modules comprising, in any order, at least two modules selected from the group consisting of a suspended-solid removal module, a bacteria-removal module, an oil-removal module, a metal-removal module, and a water-hardness treatment module.

DETAILED DESCRIPTION

Figure 1:
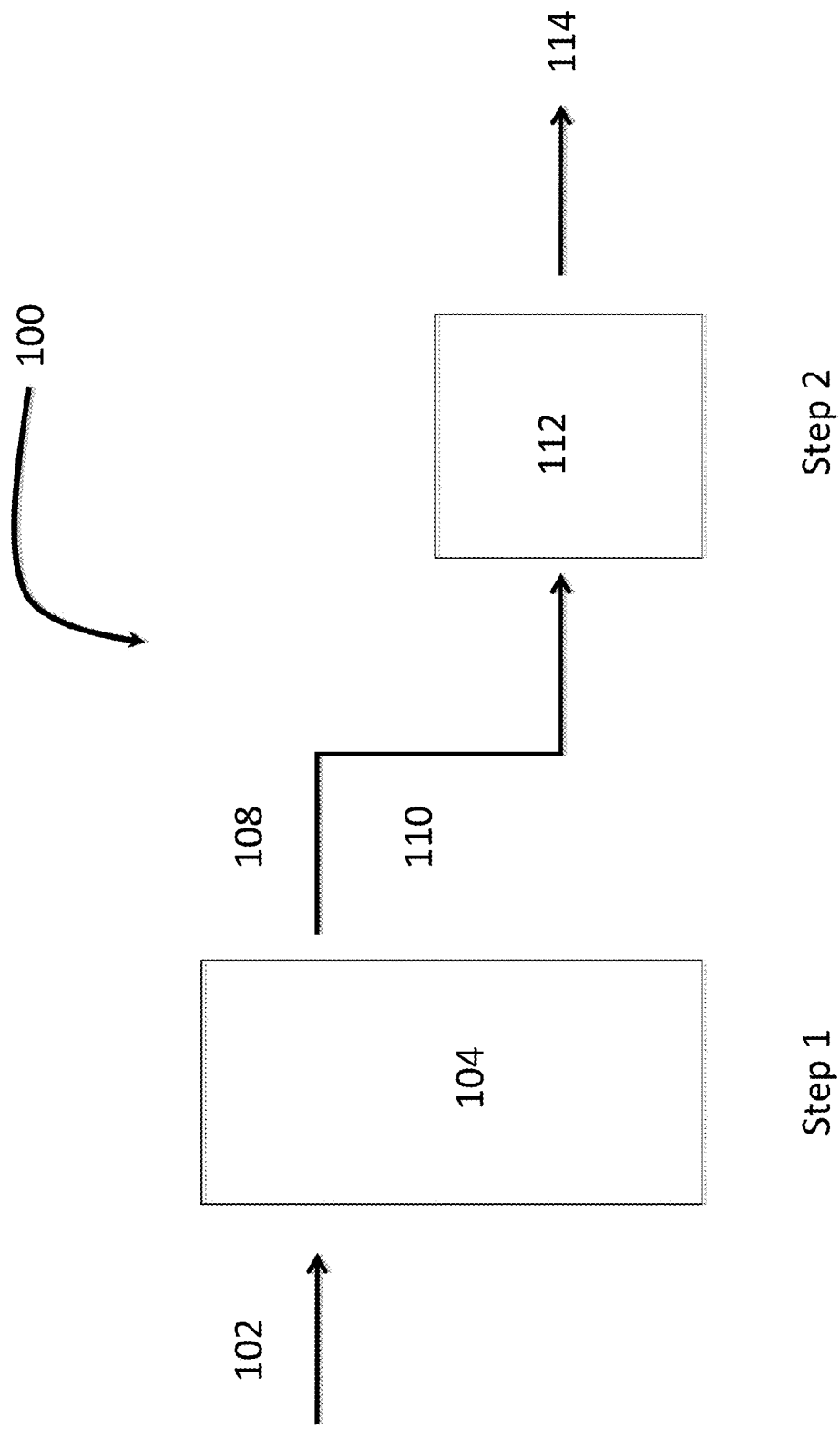
FIG. 1 shows a block diagram of a system for treating an aqueous stream.

Disclosed herein are systems and methods for removing contaminants from an aqueous stream. In embodiments, these systems and methods may be applied to particular applications, for example removal of contaminants in aqueous streams associated with the petroleum industry.

A. The Modular System Generally

In embodiments, a modular system can be used to remove contaminants from an aqueous stream. The modular nature of these systems and processes allows the arrangement of one or more filtration units in series or in parallel with each other, or with conventional water treatment systems such as reverse osmosis, distillation, filtration, or sedimentation. The filtration units may contain contaminant removal systems based on substrate-modifier technologies or oxidizing agent technologies.

1. Substrate-Modifier Technologies

Systems and methods using substrates with modifiers can be used for removing bacteria, dissolved metals, oil, and suspended solids from water. To address the specific requirements for each type of contaminant removal, a system comprising a series of filtration modules can be arranged to meet the specific needs of a wastewater stream.

In certain embodiments, the system comprises a plurality of filtration modules, each of which contains a preselected substrate, to which is attached a preselected modifier. Using such surface-modifier technologies, a system of filtration modules can be fabricated, each of which is specific for removing bacteria, metals, oil, and/or suspended solids.

As used herein, a substrate is a substance that provides a platform for the attachment of modifiers that are specific for the contaminant being removed. For particular treatments, the substrates are selected to provide advantageous attachment of modifiers for sequestering the specific contaminant.

Substrates capable of supporting modifiers in accordance with these systems and methods can include organic or inorganic materials. Organic substrates can be formed in any morphology, whether regular or irregular, plate-shaped, flake-like, cylindrical, spherical, needle-like, fibrous, etc. Organic substrates can include fibrous material, particulate matter, amorphous material or any other material of organic origin. Vegetable substrates can be predominately cellulosic, e.g., derived from cotton, jute, flax, hemp, sisal, ramie, and the like. Vegetable sources can be derived from seeds or seed cases, such as cotton or kapok, or from nuts or nutshells. Vegetable sources can include the waste materials from agriculture, such as corn stalks, stalks from grain, hay, straw, or sugar cane (e.g., bagasse). Vegetable sources can include leaves, such as sisal, agave, deciduous leaves from trees, shrubs and the like, leaves or needles from coniferous plants, and leaves from grasses. Vegetable sources can include fibers derived from the skin or bast surrounding the stem of a plant, such as flax, jute, kenaf, hemp, ramie, rattan, soybean husks, vines or banana plants. Vegetable sources can include fruits of plants or seeds, such as coconuts, peach pits, mango seeds, and the like. Vegetable sources can include the stalks or stems of a plant, such as wheat, rice, barley, bamboo, and grasses. Vegetable sources can include wood, wood processing products such as sawdust, and wood, and wood byproducts such as lignin. Animal sources of organic substrates can include materials from any part of a vertebrate or invertebrate animal, fish, bird, or insect. Such materials typically comprise proteins, e.g., animal fur, animal hair, animal hoofs, and the like. Animal sources can include any part of the animal's body, as might be produced as a waste product from animal husbandry, farming, meat production, fish production or the like, e.g., catgut, sinew, hoofs, cartilaginous products, etc. Animal sources can include the dried saliva or other excretions of insects or their cocoons, e.g., silk obtained from silkworm cocoons or spider's silk. Animal sources can be derived from feathers of birds or scales of fish.

Inorganic substrates capable of supporting modifiers in accordance with these systems can include one or more materials such as calcium carbonate, dolomite, calcium sulfate, kaolin, talc, titanium dioxide, sand, diatomaceous earth, aluminum hydroxide, silica, other metal oxides and the like. Examples of inorganic substrates include clays such as attapulgite and bentonite. In embodiments, the inorganic substrate can include vitreous materials, such as ceramic particles, glass, fly ash and the like. The substrates may be solid or may be partially or completely hollow. For example, glass or ceramic microspheres may be used as substrates. Vitreous materials such as glass or ceramic may also be formed as fibers to be used as substrates. Cementitious materials, such as gypsum, Portland cement, blast furnace cement, alumina cement, silica cement, and the like, can be used as substrates. Carbonaceous materials, including carbon black, graphite, lignite, anthracite, activated carbon, carbon fibers, carbon microparticles, and carbon nanoparticles, for example carbon nanotubes, can be used as substrates.

In embodiments, inorganic materials are desirable as substrates. Modifications of substrate materials to enhance surface area are advantageous. For example, finely divided or granular mineral materials are useful. Materials that are porous with high surface area and permeability are useful. Advantageous materials include zeolite, bentonite, attapulgite, diatomaceous earth, perlite, pumice, sand, and the like.

a. Substrate-Modifier Systems for Removing Bacteria

In embodiments, removal of bacteria from aqueous streams can be desirable. Contaminating bacteria can include aerobic or anaerobic bacteria, pathogens, and biofilm formers. In embodiments, a filtration medium comprising a substrate and a modifier can be used for removing bacteria from processed water and surface water to prepare such water for other beneficial uses. The filtration medium is capable of reducing the numbers of bacterial cells in water by contacting the filtration media with the water. The bacterial cells may be killed, disrupted, collected, or otherwise prevented from proliferating.

In embodiments, a substrate, as described above, is selected to be modified with a modifier, thereby producing a filtration medium. In embodiments, the substrate is a granular material with high surface area to offer high permeability to flow while providing efficient contact of the water with the modifier. In embodiments, the modifier can be a cationic material that can be deposited on the substrate by covalent, ionic, hydrophobic, hydrostatic interactions, or by saturation, coating, or deposition from a solution. Examples of modifiers include cationic polymers, cationic surfactants, and cationic covalent modifiers. Cationic polymers can include linear or branched polyethylenimine, poly-DADMAC, epichlorohydrin/DMA condensation polymers, amine/aldehyde condensates, chitosan, cationic starches, styrene maleic anhydride imide (SMAI), and the like. Cationic surfactants can include cetyltrimethylammonium bromide (CTAB), alkyldimethylbenzyl quats, dialkylmethylbenzylammonium quats, and the like. Cationic covalent modifiers can include quaternization reagents like Dow Q-188 or organosilicon quaternary ammonium compounds. Examples of the organosilicon quaternary ammonium compounds are 3-trihydroxysilylpropyldimethylalkyl (C6-C22) ammonium halide, 3-trimethoxysilylpropyldimethylalkyl (C6-C22) ammonium halide, 3-triethoxysilylpropyldimethylalkyl (C6-C22) ammonium halide, and the like. In other embodiments, the modifier can be an oxidizing compound such as potassium permanganate, sodium hypochlorite, and sodium percarbonate. The modified substrate can be coated with a hydrophobic layer to cause slow release of the oxidizer.

b. Substrate-Modifier Systems for Removing Dissolved Metals

In embodiments, removal of dissolved metals from aqueous streams can be desirable Contaminating dissolved metals can include iron, zinc, arsenic, manganese, calcium, magnesium, chromium, and copper. In embodiments, a filtration medium comprising a substrate and a modifier can be used for removing dissolved metals from surface water and produced water to prepare such water for use in hydraulic fracturing. The filtration media is capable of reducing the amount of dissolved metals in water, by contacting the filtration media with the water. The dissolved metals may be complexed, immobilized, precipitated, or otherwise removed from the fluid stream.

In embodiments, a substrate, as described above, is selected to be modified with a modifier, thereby producing a filtration medium. The modifier is preferably capable of being immobilized onto the substrate by mechanisms of bonding, complexing, or adhering. In embodiments, the modifier can be a polymer that has an affinity for the surface of the substrate. In embodiments, the modifier can be applied to the substrate in the form of a solution. In embodiments, the modifier is insoluble in water after it is affixed to the substrate. In embodiments, the modifier has a metal chelating group, and can be deposited on the substrate by covalent, ionic, hydrophobic or hydrostatic interactions, or by saturation, coating, or deposition from a solution. Examples of modifiers include compounds or polymers containing anionic chelant functional groups selected from the list comprising phosphate, phosphonate, xanthate, dithiocarbamate, hydroxamate, carboxylate, sulfate, and sulfide. Examples of modifiers include fatty acids, fatty amides, and vinyl polymers with the above listed chelant groups. Examples of modifiers based on vinyl polymers include comonomers of vinylphosphonic acid, vinylidenediphosphonic acid, 2-acrylamido-2-methylpropane sulfonic acid (2-AMPS), acrylamide-N-hydroxamic acids, itaconic acid, maleic acid, and salts thereof.

c. Substrate-Modifier Systems for Removing Suspended Solids

Suspended solids are often removed from fluid streams by filtration or sedimentation. In the case of finely divided solids or colloids, however, sedimentation is slow and filtration can be difficult. While filtration technologies, for example, sand filtration, is known in the art to remove finely divided suspended solids from liquids, these contaminants have low affinity for the medium, so their removal can be inefficient.

In hydraulic fracturing, suspended solids in the frac fluid can cause formation damage, plugging and lost production. Hence, the removal of such substances from the frac fluid is desirable. Suspended solids can include materials like clays, weighting agents, barite, drilling muds, silt, and the like. In embodiments, a filtration medium comprising a substrate and a modifier can be used for removing suspended solids from surface water and produced water more rapidly and efficiently than currently-practiced technologies, to prepare such water for use in hydraulic fracturing.

In embodiments, a substrate, as described above, is selected to be modified with a modifier, thereby producing a filtration medium. In embodiments, the substrate is a granular material with high surface area to offer high permeability to flow while providing efficient contact of the water with the modifier. Modifiers useful in the removal of suspended solids according to these systems and methods include cationic polymers, cationic surfactants and cationic covalent modifiers. Examples of cationic polymers include linear or branched polyethylenimine, poly-DADMAC, epichlorohydrin/DMA condensation polymers, amine/aldehyde condensates, chitosan, cationic starches, styrene maleic anhydride imide (SMAI), and the like. Examples of cationic surfactants include cetyltrimethylammonium bromide (CTAB), alkyldimethylbenzyl quats, dialkylmethylbenzylammonium quats, and the like. Examples of cationic covalent modifiers include quaternization reagents like Dow Q-188 or organosilicon quaternary ammonium compounds. Examples of the organosilicon quaternary ammonium compounds are 3-trihydroxysilylpropyldimethylalkyl (C6-C22) ammonium halide, 3-trimethoxysilylpropyldimethylalkyl (C6-C22) ammonium halide, 3-triethoxysilylpropyldimethylalkyl (C6-C22) ammonium halide, and the like.

d. Substrate-Modifier Systems for Removing Hardness

Hardness ions like Ca, Mg, Ba, and Sr can cause scaling and plugging of equipment and producing zones of the petroleum formation as a result of hydraulic fracturing operations. These multivalent cations also cause precipitation or higher dose requirements of certain additives needed in fracturing, for example friction reducing agents. For these reasons, elevated hardness is undesirable in frac water. Typical concentrations of hardness ions in fresh water sources are in the range of 20-250 mg/L as $CaCO_3$. Flowback water from a fracturing operation can contain much higher concentrations of hardness ions, up to 30,000 mg/L as $CaCO_3$, as a result of contacting underground sources of such materials Conventional treatments for softening water (i.e., removing hardness ions) include ion exchange, distillation, reverse osmosis (RO) desalination, and lime softening, and each has known disadvantages. Ion exchange requires periodic regeneration with brine and this corrosive brine is a handling and disposal issue. Distillation and RO are energy- and equipment-intensive. Lime softening is sometimes practiced on a large scale in municipal water treatment systems, but the process generates a lime sludge that is difficult to dewater and manage. To avoid some or all of these disadvantages, the systems and methods disclosed herein utilize a two-step process: 1) precipitation of hardness ions, and 2) removal of the precipitate with a substrate-modifier system.

In embodiments, the first step can involve precipitation of hardness ions by using an alkali source such as sodium carbonate, sodium bicarbonate, or sodium hydroxide. Treatment with the alkali causes formation of calcium carbonate crystals. The precipitation step can remove Ca, Mg, Ba, Sr, Fe ions as precipitated carbonates or hydroxides, and the precipitated solids facilitate removal of other suspended solids, oil and bacteria. All of these solids are collected as a sludge and the resulting water is clarified. After the precipitation, the $CaCO_3$ particles need to be removed from the water to complete the treatment.

Removing the $CaCO_3$ particles can take place by contacting them with a substrate-modifier system. Advantageously, a mineral substrate can be used, with a size between 0.01-5 mm in diameter. The substrate particles can be modified with polymers such as linear or branched polyethylenimine, poly-DADMAC, epichlorohydrin/DMA condensation polymers, amine/aldehyde condensates, chitosan, cationic starches, and styrene maleic anhydride imide (SMAI). In other embodiments, the modifier polymers can be anionic types such as acrylamide/acrylate copolymers or carboxymethyl cellulose; or nonionic types such as polyacrylamide or dextran.

e. Substrate-Modifier Systems for Removing Oil

In embodiments, a filtration medium comprising a substrate and a modifier can be used for removing oil from processed water and surface water to prepare such water for use in hydraulic fracturing. The filtration medium is capable of reducing the concentration of suspended or emulsified oil in water by contacting the filtration media with the water. In hydraulic fracturing, suspended or emulsified oil in the frac fluid can cause formation damage, plugging, microbial growth, and elevated demands for additive chemicals. Hence the removal of oil from frac fluid components is desirable. Contaminating oil in frac fluids can include oil from the petroleum reservoir, lubricants, or drilling fluid additives.

In embodiments, a substrate, as described above, is selected to be modified with a modifier, thereby producing a filtration medium. In embodiments, the substrate is a granular material with high surface area to offer high permeability to flow while providing efficient contact of the water with the modifier. In embodiments, the modifier can be a hydrophobic cationic material that can be deposited on the substrate by covalent or ionic bonding. The modifier can be applied by saturation, coating, or deposition from a solution. Examples of modifiers include cationic polymers and cationic surfactants. In embodiments, the modifier can be an organosilicon quaternary ammonium compound. Examples of the organosilicon quaternary ammonium compounds are 3-trihydroxysilylpropyldimethylalkyl (C6-C22) ammonium halide, 3-trimethoxysilylpropyldimethylalkyl (C6-C22) ammonium halide, 3-triethoxysilylpropyldimethylalkyl (C6-C22) ammonium halide, and the like.

2. Oxidizing Agent Technologies

Systems and methods that provide oxidizing agent modules carry out three steps: (1) oxidizing the contaminant in the aqueous stream, (2) removing the oxidized particles from the aqueous stream, and (3) treating the aqueous stream to remove residual oxidants and other processing materials. Processes in accordance with these systems and methods can take advantage of the different solubilities of reduced and oxidized species of contaminants.

In an embodiment, systems and methods can be arranged in accordance with the system as depicted in FIG. 1. As shown in FIG. 1, a system 100 can be arranged to treat an aqueous stream 102 bearing contaminants. FIG. 1 depicts an oxidizing chamber 104 containing an oxidizing agent through which the initial aqueous stream 102 can flow. The oxidizing agent can be formulated in a carrier so that it is dispensed in a sustained-release manner, for example as an encapsulated or other controlled-release species. In Step 1, contact with the oxidizing agent in the oxidizing chamber 104 oxidizes the contaminant, for example, converting ferrous ions (Fe-II) to ferric ions (Fe-III) within the aqueous stream. Emanating from the oxidizing chamber 104 is a treated aqueous stream 108 bearing the oxidized contaminants 110. In addition, the treated aqueous stream may contain byproducts of the oxidation process. For example, with the conversion of ferrous hydroxide to ferric hydroxide, hydrogen peroxide can be formed, which flows into the treated aqueous stream 108. In Step 2, the insoluble oxidized contaminant 110 is removed from the treated aqueous stream 108. As shown in FIG. 1, this can be carried out in a sequestration unit 112. The final aqueous stream 114 emanating from the sequestration unit 112 contains a substantially lowered amount of the oxidized contaminant, rendering the final aqueous stream 114 usable as a recycled water source. For example, the final aqueous stream 114 can be used for processes such as hydraulic fracturing. Desirably, the final aqueous stream 114 has been treated so that the byproducts of the oxidization process have also been removed.

Oxidants suitable for use in accordance with these systems and methods include, in embodiments, common oxidants such as ozone, oxygen, chlorine, chlorite, hypochlorite, permanganate, peroxide, persulfate, perborate, N-halogenated hydantoin, and the like. In embodiments, sodium percarbonate ($Na_2CO_3 \cdot 1.5H_2O_2$) can be used for treating water, such as frac flowback water. When dissolved in water, this oxidant releases hydrogen peroxide and sodium carbonate. Hydrogen peroxide has high oxidation potential (1.8 V) and does not increase total dissolved solid after treatment. Sodium carbonate also reduces hardness and provides a source of alkalinity which facilitates the precipitation of some metal ions including ferric iron.

In an oxidizing chamber 104, the oxidant can be combined with encapsulating or binding agents. Such agents should be stable when combined with oxidants, and hydrophilic but not soluble in water. After usage, fragments of encapsulating agent will dissolve or will be removed by filtration. The usage of encapsulating agent on the weight of oxidant ranges from 0 to 50%. In embodiments, an excess of oxidant can be used to ensure the complete oxidization of a contaminant whose concentration in the aqueous stream fluctuates over time. An oxidant excess that is less than 10 ppm, for example, can be used to account for contaminant fluctuations. However, for certain applications such as frac makeup water, the treated aqueous stream 108 preferably does not contain any oxidizing agent. For such applications, a separate filter or other component can be added distal to the oxidizing chamber 104 to remove excess oxidizing agents.

The oxidizing agent can be added to the system by different delivery mechanisms. For example, aqueous solutions of oxidants can be fed by pumping a feed solution at constant volumetric rate or on demand as determined by oxidation-reduction potential (ORP) or other detection scheme. In other embodiments, the oxidant can be delivered in the form of a gas stream, such as ozone, air, chlorine, and the like. The contact of the oxidant gas with the water stream can be facilitated by a sparger or diffuser. Alternatively, the oxidant can be delivered in a solid form such as tablets, granules, or a suspension. The delivery of the oxidant can be metered by limited solubility of a solid dosage form, or by controlled/delayed release of an encapsulated form.

As described above, for certain oxidized contaminants 110 such as ferric hydroxide, filtration based on particle size is not effective. Accordingly, in embodiments, a sequestration unit 112 can be provided that contains filtration media having a specific affinity for ferric hydroxide. In embodiments, the sequestration unit can provide filtration media for the oxidized contaminants such as ferric hydroxide, along with the capacity for reducing residual oxidants. In embodiments, amine (primary, secondary, tertiary) modified supportive substrates can be used, for example, fatty alkyl amines and polyethyleneimines can be used.

The invention further provides filtration devices, or modules, for the removal of contaminants from an industrial waste stream. Such modules comprise a filtration medium as described herein or an oxidizing agent contained within a suitable housing. The filtration medium can be, for example, one or more of the modified substrates described herein. In an embodiment, the module comprises one filtration medium and is intended for the removal of one type of contaminant from the waste stream. In an embodiment, the housing is suitable for or adapted for insertion of the module into the waste stream and includes an upstream port for inflow of the waste stream and a downstream port for outflow of the waste stream. Each port is preferably covered by a material that permits flow of the waste stream into and out of the module, but prevents escape of the filtration medium or oxidizing agent. Such materials include porous materials and mesh materials. The housing can be made from any suitable material which is compatible with the filtration medium or oxidizing agent and the waste stream. In an embodiment, the module can be inserted into and removed from the waste stream manually. In an embodiment, a module is used to purify the waste stream until its capacity has been reached or the rate of flow through the module has decreased significantly. The module is then removed from the waste stream and replaced with a fresh module or is regenerated and re-inserted into the waste stream.

In an embodiment, the invention provides a method of removing contaminants from an industrial waste stream. The method comprises the step of directing the waste stream through one or more filtration modules of the invention. Preferably, the waste stream is directed through two or more modules which are intended to remove different types of contaminants. In an embodiment, the method includes the step of directing the waste stream through first and second modules in sequence, both modules intended to remove the same type of contaminant from the waste stream. In this embodiment, the first module removes most of the contaminant from the waste stream, and the second module serves a polishing function, further reducing the contaminant level in the waste stream.

B. Oil Industry Applications

In embodiments, the systems and methods disclosed herein can be utilized for removing specific contaminants from oil industry wastewater. In embodiments, targeted sorbents can be used that have specific affinity for the contaminant in question. The targeted sorbent can be designed by providing a supportive substrate modified with one or more combinations of functional components. The substrate can act as a solid support, sorbent, reaction template and a coalescer. In embodiments, the substrate can comprise finely divided clays or minerals, porous granular minerals, high surface area suspensions, or biomass. In other embodiments, the substrate can be introduced in fluid form such as an immiscible liquid, an emulsion, or a soluble additive. The substrate can be prepared as a solid form, such as granular, powdered, fibrous, membrane, microparticle, or coating to be contacted with fluid streams bearing oil industry wastewater. In embodiments, the substrate can be pre-treated with hydrophilic or hydrophobic polymers.

In embodiments, the substrate can be modified by contacting a solution of the modifier with the substrate, either in a flow-through setting or a batch mixture. The modifier can be placed onto the substrate by chemical bonding, for example covalent, ionic, hydrophobic, or chelation type bonds. In another embodiment, the modifier can be placed onto the substrate by coating or saturation of the substrate with the modifier. One method of coating or saturating the substrate with modifier is to apply a liquid solution of modifier onto the substrate. In either method of modification, after contacting the substrate with the solution of modifier, the residual water or other solvent can be evaporated to leave a residue of modifier on the surface of the substrate. In embodiments, the substrate can be treated with a solution or suspension of the modifier in a fluid medium, where the modifier has an affinity for the substrate causing deposition onto the substrate. The residue can be a monolayer, a coating, a partial layer, a filling, or a complex.

In embodiments, the substrate bears modifier compounds that add the specific functionality to the targeted sorbent. For example, cationic modifiers can be used to remove anionic contaminants by charge attraction, aromatic modifiers can be used to remove aromatic contaminants by pi-pi stacking, chelating modifiers can be used to target metals, etc. As examples of metal chelants, compounds such as carboxylates, phosphonates, sulfonates, phenolics, hydroxamates, xanthates, dithiocarbamates, thiols, polypeptides, amine carboxylate, thiourea, crown ether, thiacrown ether, phytic acid, and cyclodextrin can be used. In embodiments, modifiers can be multifunctional. As an example, a cationic aromatic compound used as a modifier can absorb anionic and aromatic contaminants at the same time.

In embodiments, modifiers can be designed having high affinity for specific contaminants. As would be understood by those of skill in the art, combinatorial methods can be used to identify appropriate modifiers. By using combinatorial ligand libraries of metal ion complexes, for example, ligands can be selected for binding specific metal ions. In embodiments, ligands for binding metals can be selected whose bonds are reversible under certain conditions, such as by adjusting pH. Certain polypeptides, for example, demonstrate this behavior. Under these circumstances, metal ion chelation, for example as carried out by polypeptides, can be reversed by pH adjustment so that the metals can be reclaimed after being removed from the wastewater.

In embodiments, specifically selected or designed polypeptides and proteins can be used as modifiers for forming a targeted sorbent in accordance with these systems and methods. For example, metallothioneins (MTs) can be used as modifiers to be affixed to a substrate for sequestering metal ions. MTs are a superfamily of low molecular weight (MW~3500 to 14000 daltons) cysteine-rich polypeptides and proteins found in biological systems (e.g., animals, plants and fungi), where their purpose is to regulate the intracellular supply of essential heavy metals like zinc, selenium and copper ions, and to protect cells from the deleterious effects of exposure to excessive amounts of physiological heavy metals or exposure to xenobiotic metals (such as cadmium, mercury, silver, arsenic, lead, platinum) heavy metals. Typically MTs lack the aromatic amino acids phenylalanine and tyrosine. MTs bind these metals through the sulfhydryl groups of their cysteine (Cys) residues, with certain metal preferences in a given structure based on the distribution of these Cys residues. Due to their primary, secondary, tertiary and quaternary structures, these proteins have high ion binding selectivity. Metal ions in MT molecules can be competitively displaced by other metal ions that have stronger affinities to MT. Other peptides such as phytocheletins (PCs) (oligomers of glutathione) have a similar metal chelating function. MTs and PCs, or analogues thereof, can be covalently attached to hydrophilically modified supportive materials, such as mineral particles or natural plant fibers. The resulting functionalized materials can be used to remove specific selenium and zinc ions from refinery wastewater streams. In embodiments, other naturally derived or synthetically produced agents having heavy metal binding capabilities can be used as modifiers to form a targeted sorbent useful for specific heavy metals in refinery wastewater streams.

Other metal scavengers, for example, non-polymeric compounds, can be used as modifiers for forming a targeted sorbent in accordance with these systems and methods. In embodiments, small molecules can be used to sequester metal ions. As an example, taurine (2-aminoethanesulfonic acid), a naturally-occurring sulfonic acid derived from cysteine in biological systems, can complex with zinc, and may bind with other heavy metals such as lead and cadmium. It has no affinity for calcium or magnesium ions, though. A modifier like taurine would permit a targeted sorbent to have selective metal ion binding capability.

In embodiments, the modified substrate can be used as a treatment agent for removal of undesirable compounds from petroleum industry wastewaters. In one embodiment, the treatment agent can be a granular filter media that is enclosed in a pressure vessel, for example to allow a certain contact time with the process fluid such as wastewater. In another embodiment, the treatment agent can be a finely divided material that is contacted with a process stream with the treatment agent (complexed with contaminants) being allowed to separate by sedimentation, centrifugation, or filtration. In embodiments, the treatment agent can be formed into fibrous or loose fill material that is contacted with the process stream. In embodiments, the treatment agent can be a coating or membrane that removes contaminants from liquids that pass through or pass over the coating or membrane. The contaminants that complex with the treatment agent can then be removed from the process stream and disposed, recycled, incinerated or otherwise treated to render the contaminants immobilized or detoxified.

C. Frac Water

In embodiments, the systems and methods for treating wastewater can be used for treating water for use in hydraulic fracturing. These systems and methods, while applicable to treating any water supply, are particularly advantageous for treating frac flowback water. For example, in hydraulic fracturing, dissolved metals in the frac fluid can cause formation damage, plugging, lost production and elevated demand for additive chemicals. Hence the removal of these dissolved metals from the frac fluid is desirable. In addition to the general purification problems for frac water, there is typically a high iron concentration that can be as high as 200-300 ppm; this should desirably be reduced to a concentration <5 ppm if the water is to be suitable for use in hydraulic fracturing.

In more detail these systems and processes can comprise a plurality of specific treatment systems arranged in a preselected sequence, including a system for removing suspended solids, a system for removing oil, a system for improving water hardness, a system for removing metals, and/or a system for removing bacteria. In hydraulic fracturing, bacteria in the frac fluid can cause formation damage, toxic hydrogen sulfide generation, corrosion of equipment, and degradation of additive chemicals. Hence the removal of bacteria from frac fluid components is desirable.

As would be understood by those of ordinary skill in the art, different sets of treatment systems may be required for treating surface water (which tends to contain lower levels of contaminants and fewer kinds of contaminants) than for treating processed water. Arrangements of the individual treatment systems is modular, and can be organized in a circuit containing any number of filtration components to provide a sequential filtration pathway.

Figure 2:
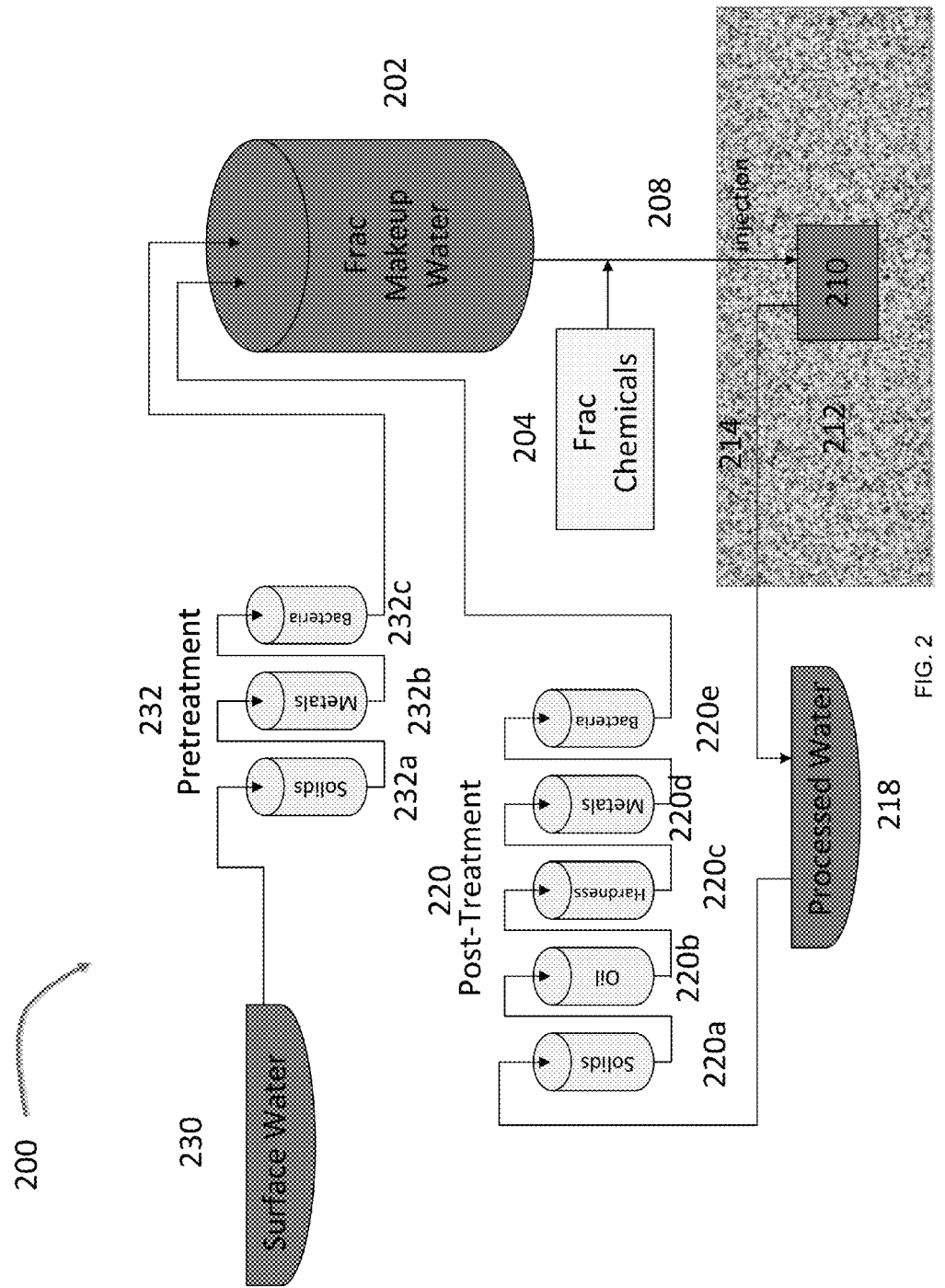
FIG. 2 depicts schematically a system for treating an aqueous stream.

An embodiment of a system 200 for hydraulic fracturing is shown in FIG. 2. As shown in this Figure, frac makeup water 202 is combined with frac chemicals 204 to form a fracturing (or "frac") fluid that is introduced along an injection path 208 into a natural gas well or oil well under high pressure to effect hydraulic fracturing. After the hydraulic fracturing is performed, the spent frac fluid percolates through the geological formation 212 in which the well 210 is located to flow out of the formation 212 along a flowback path 214. The spent frac fluid can them be collected as processed water 218 that can be reused in the hydraulic fracturing process.

In the depicted embodiment, processed water 218 enters a post-treatment facility 220 containing a plurality of water treatment systems or modules, such as a system for removing suspended solids 220a, a system for removing oil 220b, a system for improving water hardness 220c, a system for removing metals 220d, and/or a system for removing bacteria 220e. Treated processed water exits the post-treatment facility 220 to be reused as a component of frac makeup water 202. In embodiments, treated processed water makes up about 30% of frac make-up water 202, while treated fresh water makes up about 70% of frac makeup water 202. In the depicted embodiment, fresh water 230 enters a pre-treatment facility 232, containing a plurality of water treatment systems, such as a system for removing solids 232a, a system for removing metals 232b, and/or a system for removing bacteria 232c.

The water stream in the system 200 for hydraulic fracturing proceeds in a sequential manner through the stages of pre-treatment 232 and through the stages of post-treatment 220. As depicted in FIG. 2, the sequential filtration includes stages for removing suspended solids, metals and bacteria as part of pretreatment 232, and stages for removing suspended solids, oil, hardness ions, metals and bacteria as part of post-treatment 220. The treatment stages for pretreatment (232a, 232b, and 232c) are arranged in a preselected order to optimize efficiency, as are the treatment stages for post-treatment (220a, 220b, 220c, 220d, and 220e). It is understood that the arrangement of the stages for sequential filtration can be determined by the needs of a particular water filtration system, and certain stages can be removed or added or otherwise modified, based on the levels and types of contaminants in the water to be treated. Additional circuits can be incorporated into a sequential filtration system to provide for bypass in the event that a specific stage is unnecessary, or for diversion to a backup mechanism if the primary filtration stage system is saturated or otherwise malfunctioning.

As described above, a number of component modular subsystems can be integrated into a system for treatment of water for hydraulic fracturing. In embodiments, these component subsystems can be incorporated into a sequential filtration system that does not require continuous manpower monitoring, that does not involve the addition of exogenous chemicals, and that does not release chemical residues into the treated effluent streams.

In embodiments, a sequential filtration system can be arranged in stages that allow removal of undesirable contaminants from fluid streams to be used in hydraulic fracturing. In embodiments, a sequential filtration system can allow removal of undesirable contaminants from low-quality water streams, such as industrial effluents, creating a higher quality of water stream for use in hydraulic fracturing. Each of the filtration stages comprises the use of selective filtration media (i.e., substrate-modifier technologies) for the removal of dissolved metals, suspended solids, oil, bacteria, and/or other contaminants. The selective filtration media are arranged in a circuit that is capable of continuous operation without requiring constant monitoring or adjustments by an operator. This contrasts with traditional filtration systems that require more intensive monitoring. For example, traditional sedimentation processes for removal of bacteria, solids, metals, and the like must be monitored to ensure that the additive chemicals are not underdosed or overdosed. The traditional separation processes for removing bacteria, solids, metals, oils, and the like typically require the constant feed of additive chemicals (biocides, polymers, precipitants, etc.) to separate the contaminants. Overdose will result in poor separation, excessive costs, and residual treatment chemicals in the "treated" effluent. Underdose will cause incomplete or inefficient removal of the contaminants from the fluid stream. The sequential filtration system as disclosed herein operates by means of a substrate-modifier system, where additive chemicals are fixed onto the surface of a filtration media, so the dosage requires no monitoring.

In addition, traditional treatment systems can erroneously deliver the treatment chemicals into the effluent when overdosage occurs, or they can allow residual contaminants to remain in the water if the treatment is inadequate. In either of these cases, undesirable substances (treatment chemicals or residual contaminants) are then reintroduced into the formation when the water is recycled for use in hydraulic fracturing. These chemicals can then enter groundwater, potentially causing health hazards and/or environmental damage. The sequential filtration system as disclosed herein immobilizes treatment agents so that they do not enter the fluid stream, and provides an overabundance of treatment agents so that contaminants are effectively removed.

The sequential filtration system disclosed herein can include back-up systems so that once a certain stage is saturated, the backpressure can cause the fluid stream to be diverted to a back-up circuit. The diversion can be accomplished by methods known to those of ordinary skill in the art, including pressure relief valves, an automated control system, or an arrangement of parallel circuitry that connects the back-up circuit to the main circuit. The automatic back-up circuit further reduces the need for human monitoring. Other mechanisms, such as automatic filter changing, can be introduced to decrease requirements for operator intervention.

In embodiments, the oxidizing agent technologies previously described can be advantageously applied to removing undesirable ions from frac water. For example, ferrous and ferric ions as found in frac water, have different solubilities in water. At the pH of frac flowback water, for example between pH 4.0 and pH 7.0, $Fe^{+++}$ is much less soluble than $Fe^{++}$, forming a colloidal precipitate of $Fe(OH)_3$. This principle allows the iron in frac water to be rendered insoluble by oxidization, so that it can be removed. However, it is understood that the settling and coagulation of precipitated $Fe(OH)_3$ are very slow, especially in a continuous flow through process. The finely dispersed $Fe(OH)_3$ particles especially in colloidal forms are difficult to remove by filtration through common filtration media like sand, zeolite, diatomaceous earth, etc. Hence, systems and methods for removal of ferric hydroxide and other oxidized species from fluid streams are desirably incorporated in a process for treating fluid streams such as frac water.

EXAMPLES

Materials

The following materials were used in the Examples below:
Zeolite (8/40 mesh) was supplied by Bear River Zeolite
Lupasol G20 was supplied by BASF
Styrene maleic anhydride imide (SMAI 1000) was supplied by Sartomer (now Cray Valley)
Anionic flocculant (Magnafloc LT30) was supplied by Ciba.
Potassium permanganate, poly-DADMAC, lignin, phosphoric acid, urea, sand, sodium hydroxide, and sodium carbonate were supplied by Sigma Aldrich Example 1

Filtration media were prepared as follows. Samples of 8/40 mesh zeolite were treated with 10% actives weight basis of modifiers in methanol solution as follows: poly-diallyldimethylammonium chloride (p-DADMAC) (Filter 1), Lupasol G20 water free (Filter 2), SMAI 1000 (Filter 3). A sample of 8/40 mesh zeolite was treated with 5% weight basis of quaternary silane Dow Corning 9-6346 (Filter 4). After treatment with solutions of the modifiers, the modified substrates were dried to remove residual water and methanol. A sample of 8/40 mesh zeolite were treated with 4% weight basis of potassium permanganate (KMnO4) air dried, and then rinsed with DI water until the wash water was clear (Filter 5).

Example 2

A sample of surface water was collected from Claypit Pond, Belmont, Mass. All bacteria treatment tests were performed on the same day that the sample was collected. Water samples were passed through a 1.27 cm ID by 20 cm height chromatography glass column packed with filtration media prepared in accordance with Example 1 at calculated flow rates that were controlled by a Teflon stopcock. The contact time of the water with the each sample of filtration media was calculated based on the empty bed volume of the each media sample. For example, 1.27 cm internal diameter column with a 15 cm bed height is equivalent to 19.5 mL of bed volume. In this example, a flow rate of 3.9 mL/min corresponds to a contact time of 5 minutes.

Following exposure to the filtration media, the resultant water samples were tested to determine the residual bacterial contamination levels by measuring bacteria plate counts for each sample. Bacteria plate counts were measured by SimPlate for HPC (heterotrophic plate counts) Multi Dose method developed by IDEXX Laboratories, which is similar to the standard Pour Plate method using Total Plate Count. The IDEXX SimPlate method requires incubation of inoculated plates for 48 hours at 35° C. (The traditional method uses agar plates incubated at 35° C. for 48 hours as described in Standard Methods for the Examination of Water and Wastewater, $19^{th}$ Edition.) Using the IDEXX method, an untreated water sample was tested, and each of the media-treated water samples was tested at the same starting time. Before inoculation, the water samples were diluted to make the results fall into the working range of the test. After the requisite 48 hours incubation, the number of bacterial colonies on the plates were counted according to the instructions and the dilution factor was applied. The results of these enumeration tests are presented in the table below.

TABLE 1

Bacteria removal results

| Media | Filter No. | Water-filtration media contact time (min) | Filtered water bacteria count (cfu/ml) |
|---|---|---|---|
| Control (no filtration media exposure) | n/a | n/a | 60,000 |
| Zeolite-Silane | 4 | 18 | 150 |
| Zeolite-polyDADMAC | 1 | 19 | 40 |
| Zeolite-Lupasol G20 | 2 | 21 | 3,110 |
| Zeolite-SMAI 1000 | 3 | 21 | 3,720 |
| Zeolite-KMnO$_4$ | 5 | 13 | 4,140 |

This example demonstrates that the modified media was able to reduce the amount of bacteria from 60,000 cfu/mL to as low as 40 cfu/mL, representing a >99.9% reduction in bacteria. The filtration media prepared for Filter 1 yielded the greatest reduction in bacteria.

Example 3

Zinc removal tests were conducted using two test media, one that was formulated using lignin and one that was formulated using lignin phosphate. The lignin medium, used for Test A, was used as received from Aldrich Chemical. The lignin-phosphate medium, used for Test B, was prepared by phosphorylation of lignin according to methods disclosed in Journal of Applied Spectroscopy, Vol. 48 (2), 1988. The ratio of phosphoric acid to lignin used in the test formulation was 0.88:1. For each zinc removal test, a 100 ppm $ZnCl_2$ solution was prepared as the test solution, and 20 ml of this solution was used as a test sample. For each test, Test A and Test B, 20 ml of the $ZnCl_2$ solution was used. For Test A, 0.1 gms of the lignin medium was mixed into the $ZnCl_2$ solution, and it was stirred for between 1 and 1.5 hours at room temperature (20-22° C.). For Test B, 0.1 gms of the lignin-phosphate medium was mixed into the $ZnCl_2$ solution, and it was stirred for between 1 and 1.5 hours at room temperature (20-22° C.). At the end of the stirring period, each solution was centrifuged or filtered to remove the test medium. Zinc concentrations in the resultant solution were directly tested by a Zinc Check testing strip (Industrial Test Systems Inc.) to measure residual zinc concentration.

TABLE 2

Metal removal test results

| Test ID | Test Media | [$Zn^{2+}$] before treatment (ppm) | [$Zn^{2+}$] after treatment (ppm) |
|---|---|---|---|
| A | Lignin | 100 | 20 |
| B | Lignin-Phosphate | 100 | <10 |

This example demonstrates that lignin is capable of reducing zinc concentrations, and that phosphorylated lignin is more effective than unmodified lignin at removing zinc.

Example 4

Produced water samples with a turbidity >1000 NTU were obtained from an operating gas well. For each suspended solids removal test, a 200 ml sample of this water, 200 mL was passed through a chromatography glass column (1.27 cm ID by 20 cm height) packed with an 8 cm bed of a filter medium. Three filter media were tested: Sand-polyDADMAC, Sand-SMAI 1000, and Zeolite-polyDADMAC. To prepare the sand-based filter media, samples of washed sand were treated with 10% actives weight basis of modifiers in methanol solution as follows: poly-diallyldimethylammonium chloride (p-DADMAC) and SMAI 1000. To prepare the zeolite-based filter media, a sample of 8/40 mesh zeolite was treated with 10% weight basis of poly-diallyldimethylammonium chloride (p-DADMAC). After treatment with solutions of the appropriate modifiers, the modified substrates were dried to remove residual water and methanol. Following filtration, the turbidity of the filtered water was measured using a Hach 2100P turbidity meter.

TABLE 3

Results of suspended solids removal test

| Media and modifier | Water turbidity after filtration (NTU) |
|---|---|
| None | >1000 |
| Sand-polyDADMAC | 59 |
| Sand-SMAI 1000 | 23 |
| Zeolite-polyDADMAC | 57 |

Example 5

Produced water samples (hydraulic fracture flowback water samples) were obtained from an oilfield operation.

Experiment A. The samples were first mixed with caustic soda to adjust pH to 10.6, followed by soda ash addition (2.9%) to precipitate metal ions. Water and precipitated solids were then separated by centrifuge or filtration. Hardness and iron in the treated water were measured on a Hach test kit 183700 (model HA-62). Calcium and magnesium concentrations were tested based on Hach Method 8030.

TABLE 4

Multivalent ion removal

| | Before treatment | After treatment |
|---|---|---|
| Total hardness (CaCO$_3$ mg/l) | 29,070 | 428 |
| Calcium (mg/l) | 7,932 | 74.4 |
| Magnesium (mg/l) | 691.5 | 38.5 |
| Iron (mg/l) | 112 | 0 |

These results demonstrate that the combination of alkali (pH adjusted to 10.6 with NaOH) and sodium carbonate (2.9% weight on produced water) treatment was highly effective in removing multivalent ions like calcium, magnesium and iron (Fe$^{2+}$ and Fe$^{3+}$). In addition, these results show the removal of >98% of the hardness and all of the measurable iron by the precipitation process. However, the precipitated slurry settling rate was 0.18 mm/min and the solids were difficult to separate.

Experiment B. To enhance the separation of precipitated solids from the treated water, a filtration agent was used. In this experiment, sand was modified with poly-DADMAC (5%) as disclosed in Example 1. Upon treatment of the precipitated solids with sequential addition of 5 ppm anionic polymer flocculant (Magnafloc LT-30) and poly-DADMAC modified sand, the settling rate increased to 17.40 mm/min. The increased settling rate improves the separation and recovery of the precipitated solids.

Example 6

Frac Flowback Water Testing

Ferrous iron concentrations from water samples were tested according to Hach Method 8146, and Hach Method 8008 for total iron concentrations. Ferric iron concentrations were calculated by subtraction of ferrous iron concentration from total iron concentration. Water hardness was tested with Hach test kits HA-62A. Hydrogen peroxide concentration was measured by Quantofix Peroxid 100 test strips. Concentration units in mg/L and ppm are exchangeable. Turbidity was measured by Hach 2100P Turbidimeter.

In the Examples below, frac flowback water samples from a hydraulic fracturing operation containing high level concentrations of ferrous ions were tested. Table 5 shows total iron and ferrous iron concentrations from two different sample containers.

TABLE 5

Total Iron and Ferrous Ion in Frac Flowback Water Samples

| Container # | Total Iron, mg/L | Fe$^{2+}$, mg/L |
|---|---|---|
| 1 | 282 | 191 |
| 2 | 208 | 161 |

Example 7

Use of an Iminodiacetic Acid Resin for Fe Removal from Frac Flowback Water

Iminodiacetic acid (IDA) resin, Purolite 5930 Plus (Purolite Company), has the following ion chelating selectivity sequence: Cu>>Ni>Zn>=Co>=Cd>Fe2+>Mn>Ca. A standardization test for the IDA resin was performed, where 0.1 g of the IDA resin was continuously mixed with 20 ml of a prepared 200 ppm Fe$^{2+}$ solution at room temperature for 1 hour in a VWR Mini Vortexer. In the standardization test, the IDA resin showed a 99% percent removal of Fe$^{2+}$ from prepared 200 ppm Fe$^{2+}$ solution by the batch method. The IDA resin was then used to test frac flowback water, using the same technique (0.1 g IDA resin was continuously mixed with 20 ml of 200 ppm Fe$^{2+}$ solution at room temperature for 1 hour in a VWR Mini Vortexer). As shown in Table 6, the IDA resin was significantly less effective when used with the frac flowback water sample. It is postulated that the high concentrations of hardness ions (two orders of magnitude higher than Fe$^{2+}$) interfered with the efficacy of the IDA resin.

TABLE 6

Ferrous Ion Removal from Frac Flowback Water by Purolite S930 Plus

| | Before | After |
|---|---|---|
| Fe$^{2+}$, ppm | 161 | 107 |
| Total Hardness as CaCO3, ppm | 28,728 | 29,070 |

Example 8

Sodium Percarbonate Column Filtration 0.5 gram cellulose acetate was dissolved in 20 ml acetone, then 2.5 grams granular Na$_2$CO$_3$.1.5H$_2$O$_2$ (Aldrich) was mixed in the batch. The majority of acetone was removed by rotary evaporation to yield cellulose-acetate-encapsulated sodium percarbonate granules. The encapsulated sodium percarbonate granules were molded into a cylindrical die and solvents were further evaporated by vacuum drying, forming cylindrical tablets. A total of 5 tablets were loaded on the top of a 7-cm of 50-70 mesh sand bed (Aldrich) which was pre-filled into an 18.7 mm ID glass column. Frac flow back water was filtered continuously by gravity for 6 hours with adjusted flow rate of 3-5 ml/min. The five tablets still maintained the tablet shape, while hydrogen peroxide was continuously released.

Table 7 shows the iron removal performance through column filtration.

TABLE 7

Iron Removal from Frac Flowback Water by Encapsulated Sodium Percarbonate

| | Before Filtration | After Filtration |
|---|---|---|
| Fe$^{2+}$, ppm | 161 | 0.3 |
| Total Iron, ppm | 208 | 5.5 |
| Total hardness, ppm (as CaCO$_3$) | 28,728 | 27,360 |
| pH | 4.74 | 5.05 |

Example 9

Sodium Percarbonate Cartridge Flow-Through Filtration 2 grams cellulose acetate were dissolved in 20 ml acetone, then mixed in 16 grams granular Na$_2$CO$_3$.1.5H$_2$O$_2$ (Aldrich). The majority of acetone was removed in a rotary evaporator. Cellulose acetate encapsulated sodium percarbonate was then molded into a cylindrical die. Total 18 tablets were made with each tablet weighing about 1 gram.

A standard 2.5 inches by 9.75 inches axial flow cartridge (Cartridge 1) was filled with about ⅔ volume of 50/70 mesh sand or diatomaceous earth powder, and ⅓ volume of encapsulated sodium percarbonate (about 104 grams). Another standard axial flow cartridge (Cartridge 2) was loaded with fatty amine modified granular organoclay, made by coating Attapulgite (16/30 mesh, trade name UltraClear, from Oil-Dri) with 20% (weight on Attapulgite) 1-hexadecylamine according to the methods in U.S. Pat. No. 6,627,084.

Figure 3:
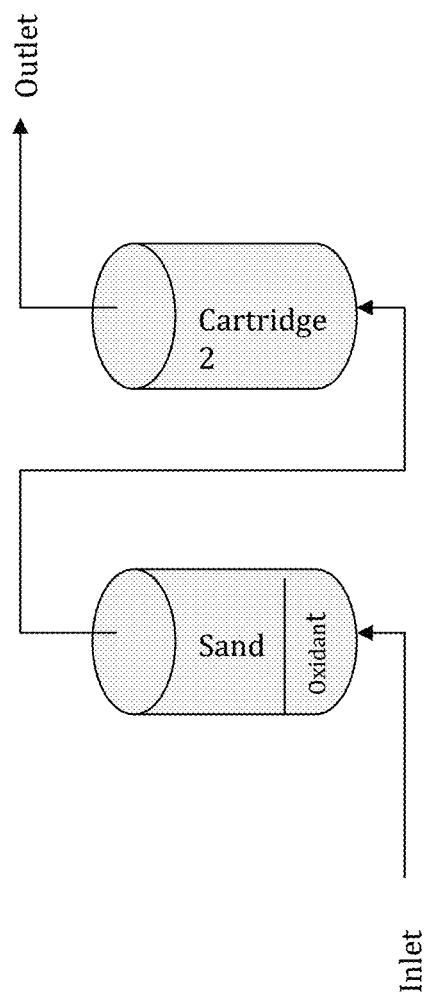
FIG. 3 depicts schematically a system for hydraulic fracturing.

Four gallons of frac flow back water with 200 ppm $Fe^{2+}$ and 28,728 ppm total hardness were filtered through these two cartridges with a flow rate of 3-4 gallons/hour. This arrangement is shown schematically in FIG. 3.

At outlet, ferrous iron was 1.5 ppm and total iron concentration was 1.5 ppm. Hydrogen peroxide was 0 ppm at outlet, and 3 ppm in-between Cartridge 1 and Cartridge 2. The results from these tests are set forth in Table 8 below.

TABLE 8

Flow-through Filtration results

|  | Before filtration | After Cartridge 1 | After Cartridge 2 |
| --- | --- | --- | --- |
| Total iron (ppm) | 200 |  | 1.5 |
| H2O2 (ppm) | 0 | 3 | 0 |
| Turbidity, NTU | 16.5 | 310 | 6.17 |

Example 10

Ferric Hydroxide Removal by Column Filtration

Modified Attapulgite column filtration was compared to unmodified Attapulgite filtration for the removal of ferric hydroxide from a test solution prepared from frac flowback water. For each column, an 18.7 ID glass column filled with 15 gm. 16/30 mesh Attapulgite in a modified form or an unmodified form, producing a column of about 7 cm in height. The modified Attapulgite samples were prepared as follows:

For the fatty-amine-modified sample, 5 grams hexadecylamine was dissolved into 30 grams of ethanol followed by addition of 25 grams 16/30 mesh Attapulgite (UltraClear, Oil-Dri). Ethanol was evaporated and the sample was further dried at 110° C. for 30 minutes. For the polyethyleneimine (PEI)-modified sample, 2.7 grams 50% PEI solution (Aldrich, Mw=750,000) was diluted in 80 grams of DI water. 27 grams of 16/30 mesh Attapulgite (UltraClear, Oil-Dri) was added to the solution and mixed for 30 minutes at room temperature. The solution was filtered and the modified Attapulgite was dried at 110° C. for 1 hour.

For testing each column, 120 ml ferric-hydroxide-containing solution was passed through the Attapulgite, with a flow rate ranging from about 5-8 ml./min. Each column was rinsed thoroughly with DI water for at least 5 minutes before introducing the test solution. To produce the test solution, frac flowback water containing about 200 ppm $Fe^{2+}$ was oxidized by sodium percarbonate tablets prepared in accordance with Example 8. The results of each test are set forth in Table 9.

TABLE 9

Attapulgite Column Filtration

|  | Turbidity before filtration, NTU | Turbidity after filtration, NTU | Peroxide after filtration, ppm | Total Iron after filtration, ppm | Filtered solution appearance |
| --- | --- | --- | --- | --- | --- |
| Attapulgite | 161 | 3.07 | 3 | 2.26 | Light yellow |
| Attapulgite-fatty amine | 183 | 0.60 | 0-1 | 0.10 | clear |
| Attapulgite-PEI | 250 | 0.15 | 0-1 | 0.09 | clear |

EQUIVALENTS

As described herein, embodiments provide an overall understanding of the principles, structure, function, manufacture, and/or use of the systems and methods disclosed herein, and further disclosed in the examples provided below. Those skilled in the art will appreciate that the materials and methods specifically described herein are non-limiting embodiments. The features illustrated or described in connection with one embodiment may be combined with features of other embodiments. Such modifications and variations are intended to be included within the scope of the present invention. As well, one skilled in the art will appreciate further features and advantages of the invention based on the above-described embodiments. For example, while the embodiments disclosed herein have been applied to water treatment before use in hydraulic fracturing formations, it is understood that certain embodiments can be applied to the treatment of water or other fluid streams produced by or used in other processes, e.g., drinking water purification, irrigation water purification, treatment of water from agricultural runoff, treatment of water from industrial processes, treatment of effluents from municipal water treatment systems, and the like. The systems and methods disclosed herein, while advantageous for removing iron from water supplies such as frac water, can also be used for removal of other water contaminants, such as manganese, sulfur, hydrogen sulfide, mercaptans, and some organic compounds. As an additional benefit, the systems and methods disclosed herein can disinfect a water supply, by decreasing the concentration of viable bacteria and other pathogens therein. Accordingly, the invention is not to be limited by what has been particularly shown and described, but rather is to be delimited by the scope of the claims. All publications and references cited herein are expressly incorporated herein by reference in their entirety. The words "a" and "an" are replaceable by the phrase "one or more."

While this invention has been particularly shown and described with references to preferred embodiments thereof, it will be understood by those skilled in the art that various changes in form and details may be made therein without departing from the scope of the invention encompassed by the appended claims.

What is claimed:

1. A method of removing contaminants from frac flowback water or oilfield produced water, wherein the contaminants comprise dissolved iron, suspended solids, and oil, and further wherein the dissolved iron comprises ferrous iron, said method comprising the steps of:

contacting the water with an oxidizing agent wherein the oxidizing agent oxidizes the ferrous iron to form precipitated ferric iron, and removing the precipitated ferric iron from the water, contacting the water with a suspended solids module comprising a targeted sorbent having a specific affinity for the suspended solids in the water, wherein the targeted sorbent having a specific affinity for the suspended solids comprises a suspended solids supportive substrate modified with a cationic polymer thereby removing the suspended solids from the water, wherein the cationic polymer is selected from the group consisting of linear or branched polyethyleneimine, poly-DADMAC, epichlorohydrin/DMA condensation polymers, chitosan, cationic starches, and styrene maleic anhydride imide; and contacting the water with an oil removal module comprising a targeted sorbent having a specific affinity for the oil in the water, wherein the targeted sorbent having a specific affinity for the oil comprises an oil removal supportive substrate modified with a hydrophobic cationic material selected from the group consisting of 3-trihydroxysilylpropyldimethylalkyl (C6-C22) ammonium halide, 3-trimethoxysilylpropyldimethylalkyl (C6-C22) ammonium halide and 3-triethoxysilylpropyldimethylalkyl (C6-C22) ammonium halide, thereby removing the oil from the water.

2. The method of claim 1, further comprising directing the water carrying the oxidized contaminants into a sequestration unit comprising a filtration medium specific for removing the oxidized contaminants, which filtration medium removes the oxidized contaminants from the water.

3. The method of claim 1, further comprising removing the excess oxidizing agent.

4. The method of claim 1, wherein the oxidizing agent is selected from the group consisting of ozone, oxygen, chlorine, chlorite, hypochlorite, permanganate, peroxide, persulfate, perborate, and N-halogenated hydantoin.

5. The method of claim 1, wherein each of the suspended solids supportive substrate and the oil removal supportive substrate is an inorganic substrate.

6. The method of claim 5, wherein each inorganic substrate is selected from the group consisting of calcium carbonate, dolomite, zeolite, calcium sulfate, kaolin, talc, titanium dioxide, sand, diatomaceous earth, aluminum hydroxide, silica, other metal oxides and clays.

7. The method of claim 6, wherein the clay is attapulgite or bentonite.

8. The method of claim 1, wherein the targeted sorbent is in series with the oxidizing agent.

9. The method of claim 1, wherein the targeted sorbent is parallel with the oxidizing agent.

10. The method of claim 1, wherein the suspended solids includes a material selected from the group consisting of clays, weighting agents, barite, drilling muds and silt.

11. The method of claim 6, wherein the inorganic substrate is selected from the group consisting of zeolite, sand, and diatomaceous earth.

\* \* \* \* \*